United States Patent
Erickson et al.

(10) Patent No.: US 7,336,095 B2
(45) Date of Patent: Feb. 26, 2008

(54) CHANGING CHIP FUNCTION BASED ON FUSE STATES

(75) Inventors: Karl R. Erickson, Rochester, MN (US); John A. Fifield, Underhill, VT (US); Chandrasekharan Kothandaraman, Hopewell Junction, NY (US); Phil C. Paone, Rochester, MN (US); William R. Tonti, Essex Junction, VT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/760,575

(22) Filed: Jun. 8, 2007

(65) Prior Publication Data

US 2007/0241768 A1    Oct. 18, 2007

Related U.S. Application Data

(63) Continuation of application No. 11/016,220, filed on Dec. 17, 2004, now Pat. No. 7,268,577.

(51) Int. Cl.
*H03K 19/00* (2006.01)
(52) U.S. Cl. .............................. 326/8; 326/37
(58) Field of Classification Search ................. 326/8, 326/37
See application file for complete search history.

(56) References Cited

U.S. PATENT DOCUMENTS 6,814,297 B2 * 11/2004 Mueller ..................... 235/492
7,154,297 B1 * 12/2006 Camarota et al. ............ 326/40

* cited by examiner

*Primary Examiner*—James H. Cho
(74) *Attorney, Agent, or Firm*—Patterson & Sheridan LLP (57) ABSTRACT

Techniques and systems whereby operation of and/or access to particular features of an electronic device may be controlled after the device has left the control of the manufacturer are provided. The operation and/or access may be provided based on values stored in non-volatile storage elements, such as electrically programmable fuses (eFUSES).

20 Claims, 4 Drawing Sheets

CHANGING CHIP FUNCTION BASED ON FUSE STATES

CROSS-REFERENCE TO RELATED APPLICATIONS

This is a continuation of U.S. patent application Ser. No. 11/016,220, filed Dec. 17, 2004 now U.S. Pat No.7,268,577.

BACKGROUND OF THE INVENTION

1. Field of the Invention

The present invention generally relates to integrated circuit devices, and more particularly, to methods and systems for preventing unauthorized access to proprietary information contained in the integrated circuit devices after the devices have left the manufacturing facility.

2. Description of the Related Art

Many integrated circuit (IC) devices, such as systems on a chip (SOC) and other types of very large scale integration (VLSI) and ultra large scale integration (ULSI) devices include interfaces that allow for access to the internal registers and other components of the devices. This access to the internal components of the devices allows for testing and troubleshooting of the devices, which is primarily conducted during the manufacturing process and in the development of the device, for optimization of performance. In addition, interfaces may allow registers to be programmed to activate a particular mode, for example, reconfiguring the I/O of a processor to increase on chip bandwidth for a given application. Examples of such interfaces include level-sensitive scan design (LSSD) scan chains and the JTAG interface, named after the Joint Test Action Group committee that established the test access port and boundary-scan architecture defined in IEEE Standard 1149. Testing algorithms that utilize such interfaces to modify and examine the internal workings of the device by reading/writing the device's internal registers are well known.

However, these test interfaces often provide an interface or "backdoor" for a hardware hacker, i.e., a person unauthorized to access information contained in the device, to gain access to the device, and more particularly, to gain access to the manufacturer's proprietary information embedded in the device. Although hacking may not be a substantial issue for many devices on the market, as there may be little economic or emotional gain to breaking into those devices, for other devices, such as those used in video game consoles, satellite decoders, and the like, there is generally substantial economic gain to be had through hacking into the internal proprietary information of these devices, as hacking can be used, for example, to enable or unlock features intended to be paid-type upgrades. In these types of systems, encryption is often employed in an attempt to protect proprietary data (e.g., copyrighted game data or subscriber-only media signals). However, recent advances in hacking techniques have allowed hackers to overcome many encryption processes through use of the test interfaces noted above.

Further, in conventional integrated circuit device manufacturing, systems on chips (SOCs) and other devices are designed and produced for relatively specific purposes. In this type of a manufacturing process, inherently there are chips manufactured that are more advanced than others, and generally speaking, the more advanced chips may often include the ability to perform the functions of the lesser advanced chips. In this situation, it is often practical from a manufacturing cost standpoint to simply manufacture only the more advanced chips and use these chips for all applications, as the cost per chip is often negligible between the more advanced chips and the lesser advanced chips. In this situation the more complex chip may be implemented into configurations of lesser complexity with the unused or more advanced portions or modules of the chip disabled. Similarly, when a more complex chip is implemented into a lesser complex application, the manufacturer has the option of enabling the disabled portions of the chip to upgrade the chip as demands necessitate.

However, from a business standpoint, manufacturing a single chip for multiple complex applications and disabling the more advanced portions of complex chips used in configurations of lesser complexity can be problematic, as chip hackers may exploit the use of the more advanced chip in a configuration of less complexity, e.g., the hackers will use unauthorized methods to unlock the disabled modules of the chip. The unauthorized access to the disabled portions of the chip decreases the manufacturer's revenue such that the manufacturing cost savings incurred as a result of manufacturing only the more advanced chips are often eliminated. Further, in some cases, hacking may result in degradation of device reliability and possibly catastrophic failure (e.g., device overheating) if an operating frequency is increased. This may be particularly problematic for a manufacturer if the hacker is not the end user, for example, if the hacker is in the supply chain and passes on a hacked device to an unsuspecting end user who then returns it to the manufacturer or seeks remedy for damages from the manufacturer.

Further still, with integrated circuit devices and SOCs, once the device or chip has shipped to the end user, the manufacturer no longer has the ability to modify, upgrade or repair the chip without removing the chip from the end user system. This limitation obviously prevents manufacturers from upgrading or repairing chips insitu.

Accordingly, there is a need for methods and apparatus for preventing unauthorized changes or activation of disabled modules or functions of integrated circuit devices once the devices have left the manufacturer. Further, there is a need for methods and systems for preventing unauthorized access to internal device information through test interfaces after the devices have left the manufacturing facility. Further still, there is a need for methods and apparatus configured to allow for insitu modification of device or chip parameters while the device is with an intermediate or end user.

SUMMARY OF THE INVENTION

The present invention generally relates methods and systems that allow operation of and/or access to particular features of an electronic device to be controlled after the device has left the control of a device manufacturer.

One embodiment provides a method for controlling access to specific modules of an integrated circuit device. The method generally includes setting a device state for the integrated circuit device in an electrically programmable fuse bank comprising a plurality of electrically programmable fuses, reading the device state from the electrically programmable fuse bank with a device controller, and disabling modules of the integrated circuit device in accordance with the device state read by the system controller.

Another embodiment provides a method for controlling access to chip registers throughout the life of the chip. The method generally includes setting a device state into a bank of electrically programmable fuses on the chip, reading the device state on startup of the chip, and configuring access to registers of the chip in accordance with the read device state during the chip initialization process.

Another embodiment provides an apparatus for controlling access to chip registers throughout the life of the chip. The apparatus generally includes a chip controller, a chip communication interface in communication with the controller, at least one chip register configured to store information therein, and an electrically programmable fuse bank positioned in communication with controller. The electrically programmable fuse bank is programmable with a unique device state that is used by the controller to regulate access to the at least one chip register via the communication interface.

Another embodiment provides a method of controlling access to features of an electronic device. The method generally includes providing a bank of electrically programmable fuses on the electronic device, shipping the electronic device in a product with a first set of features enabled, and after shipping the product, enabling an additional feature not included in the first set of features by programming one or more of the bank of electrically programmable fuses.

Another embodiment provides a method for disabling one or more features of an integrated circuit device. The method generally includes detecting an event and, in response to detecting the event, applying one or more high voltage spikes to field effect transistors (FETs) of circuits utilized to implement the one or more features, wherein the particular FETs to which the high voltage spikes are applied are determined by values stored in a bank of non-volatile storage elements.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention, and are therefore not to be considered limiting of its scope, for the invention may admit to other equally effective embodiments.

DETAILED DESCRIPTION OF THE PREFERRED EMBODIMENTS

Embodiments of the present invention provide techniques and systems whereby operation of and/or access to particular features of an electronic device may be controlled after the device has left the control of the manufacturer. The device may include a set of non-volatile storage elements, such as electronically programmable fuses (hereinafter eFUSES) that may be programmed to control the operation of or access to these features. According to some embodiments, a purposeful set of reconfiguration may be initiated by the manufacturer in order to enable chip functionality and/or minimize data bottlenecks in order to reduce test cost. For some embodiments, power and performance device characteristics for each device may be determined during manufacturing testing and each device may be subsequently configured accordingly for specific applications.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Embodiments of the present invention generally include methods and systems configured to provide restricted access to specific internal components, i.e., designated internal registers containing proprietary information, of an integrated circuit device through an interface on the device that is used to test the device during a manufacturing process. Access to the internal components of the device may be allowed during the manufacturing process, as the methods and systems of the invention are generally not enabled until the device manufacturing process, including testing of the device, is completed. After the manufacturing process for the device is completed, the methods and systems of the invention are activated. Thereafter, unauthorized access to the internal components of the device is not permitted.

One embodiment of the invention may be implemented as a program product for use with a computer or microprocessor-type system. The program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

Figure 1:
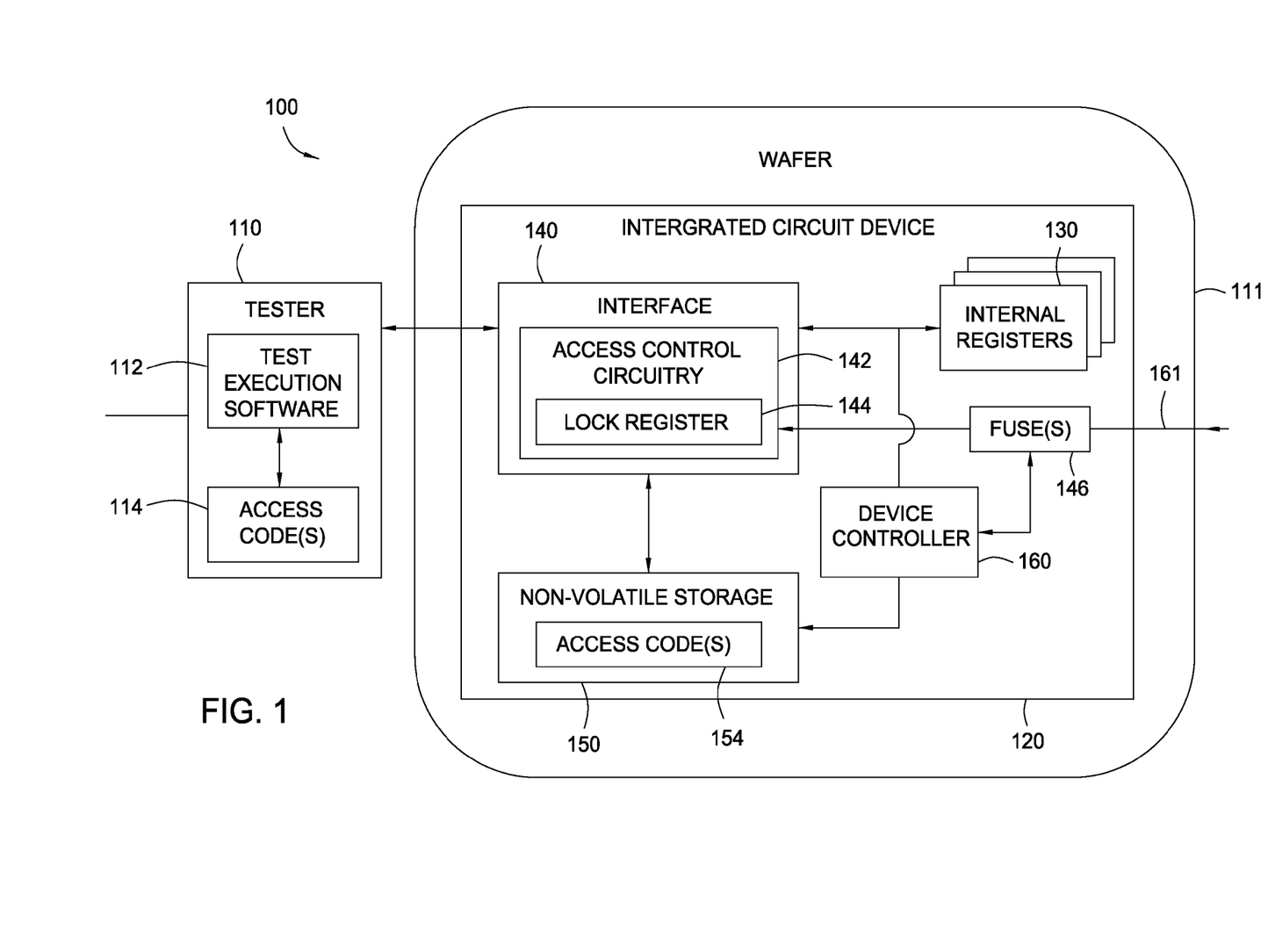
FIG. 1 illustrates an exemplary manufacturing configuration, wherein a substrate contains an integrated circuit device that is to be tested by an external testing module, in accordance with one embodiment of the present invention.

FIG. 1 illustrates an exemplary manufacturing configuration 100, wherein a wafer or substrate 111 contains an integrated circuit device 120 that is to be tested by an external testing module 110 in accordance with an embodiment of the invention. The testing module 110 generally includes any suitable combination of hardware and test execution software 112 configured to initiate test sequences on the integrated circuit device 120. Although only one integrated circuit device 120 is illustrated in the embodiment of FIG. 1, the integrated circuit device 120 may be one of many such devices 120 on the substrate 111. Additionally, one or more of the respective devices 120 may be tested by the testing module 110, either serially or in parallel. Additionally, the fuse segment 146 may be located on chip as shown, or it may be shared within devices 120 on substrate 111 (i.e., personalization of processor cores can be accomplished through a shared "fusebox").

Each integrated circuit device 120 generally includes a testing interface 140. The testing interface 140 is configured to communicate with the external testing module 110 and is configured to receive test instructions, test data strings or patterns, etc. therefrom. The testing interface 140 generally includes internal access control circuitry 142 that is configured to control the signals passing through the interface 140 in accordance with a predetermined algorithm, processing sequence, or control scheme. The testing interface is also in communication with one or more internal memory devices, such as internal registers 130 and/or a non-volatile storage element 150. The non-volatile storage element 150 may include any type of non-volatile storage elements, including any type of read-only memory (ROM) elements, non-volatile re-writable storage elements including magnetic random access memory (MRAM), or any type of fuses, such as electrically programmable fuses (eFUSEs), including anti-fuses, or laser blown fuses.

The non-volatile storage 150 generally has access codes 154 stored therein. For some embodiments, the access codes 154 may be stored in non-volatile storage 150 as part of the manufacturing process (e.g., upon completion of a test, the tester 110 may "write" the access codes to the non-volatile storage). For other embodiments, the access codes may be stored upon fabrication of the device 120. In any case, a corresponding set of access codes 114 may be maintained by the manufacturer (e.g., at the tester 110 or other storage element that is generally accessible to the tester 110). As such, when the manufacturer desires to access the device 120 after the manufacturing process has been completed, i.e., when the device 120 has encountered a failure in the field, the testing module 110 may be used in conjunction with the stored access codes 114 that correspond to that particular device 120 to test the device 120 to determine the cause of the failure. More particularly, the access codes 114 may be sent to the interface access control circuitry 142, which may be programmed to compare the access codes 114 with the stored access codes 154. If the supplied codes 114 match the stored codes 154, then the control circuitry 142 will allow access to the internal components of the device 120, i.e., registers 130, thus allowing analysis of devices 120 that have failed in the field. The access control circuitry 142 may further include one or more lock registers 144 configured to receive the externally supplied access codes 114 and to compare the externally supplied codes 114 to the internally stored codes 154. For some embodiments, the lock registers 144 may consist of a serial string of registers acting as a shift register. In any case, the lock registers 144 may be considered internal registers that are generally accessible via the interface 140. When an external device attempts to access the internal registers 130, the access control circuitry 142 may compare the access codes received in the lock registers 144 to one or more access codes 154 stored in non-volatile memory 150 to determine if access to the registers is authorized.

In one embodiment of the invention, the integrated circuit device 120 includes at least one eFUSE 146, which may comprise a bank or array of eFUSEs 146. Each of the eFUSEs 146 generally comprises a programmable element that is programmed after the manufacturing and testing processes for the device 120 have been completed. The eFUSEs 146 are programmed to either be intact or blown, where an intact eFUSE is electrically conductive under normal device operating parameters, and where a blown eFUSE is normally not conductive under normal device operating parameters. The conductive or intact state of the eFUSE 146 may be used to generate a high or positive logic state for digital applications, and the blown or non-conductive state may be used to represent a low or negative digital logic state.

The eFUSEs 146 generally represent an electronically controllable or programmable eFUSE that can be programmed only once and are not typically reversible or resettable. For some embodiments, the eFUSES may be formed and may operate as described in the article by C. Kothandaraman and S. Iyer, "Electrically Programmable Fuse (eFUSE) USING Electromigration in Silicides," IEEE Electron Device Letters, Vol. 23, No. 9, September 2002. As described therein, the structure of eFUSEs 146 may be based upon the electromigration properties of a thin (generally nanostructure) conductive layer that is coated onto a thin resistive layer (also generally a nanostructure). The thin conductive layer has a current passed through it that sets up a thermal gradient and causes the conductive material to migrate to one end of the resistive material. This migration essentially opens the electrical circuit created by the conductive layer, thus blowing or programming the eFUSE.

Figure 2A:
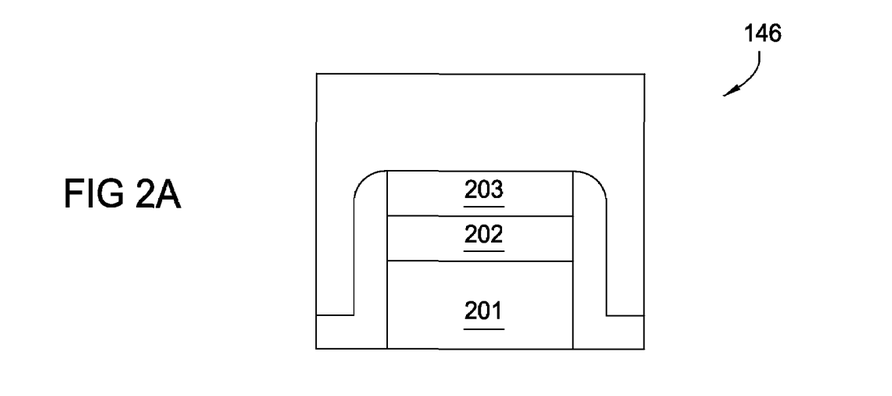
FIG. 2A illustrates a cross-sectional view of an exemplary eFUSE, in accordance with one embodiment of the present invention.
Figure 2B:
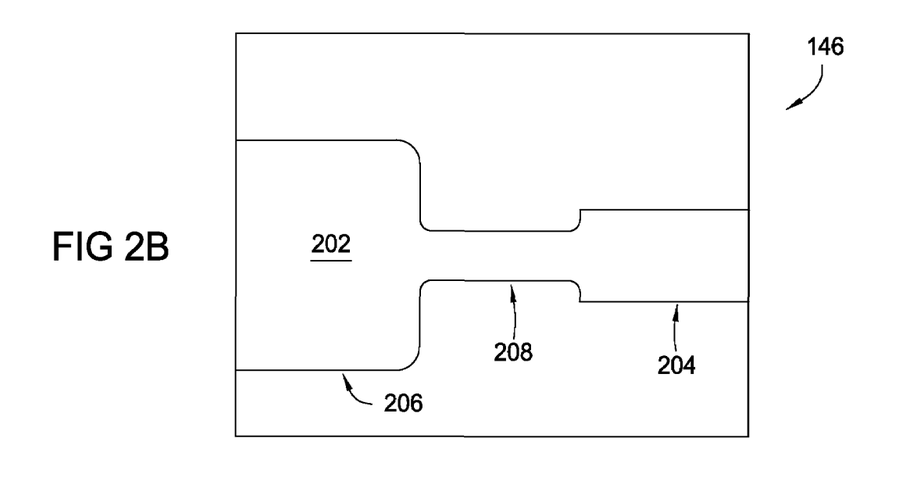
FIG. 2B illustrates a top view of an exemplary eFUSE of the invention in an intact or conductive state, in accordance with one embodiment of the present invention.
Figure 2C:
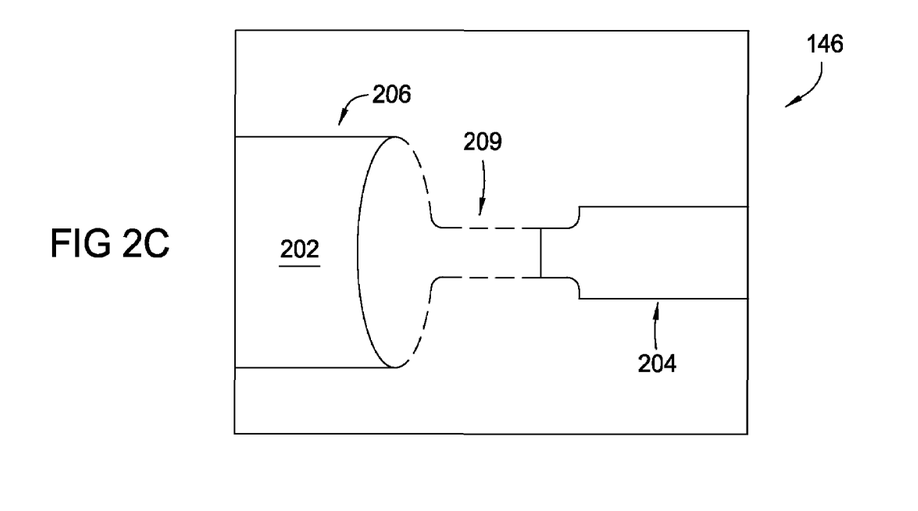
FIG. 2C illustrates a top view of an exemplary eFUSE of the invention in blown or non-conductive state, in accordance with one embodiment of the present invention.

FIG. 2A illustrates a cross section view of an exemplary eFUSE 146 of the invention. The eFUSE 146 generally includes a layer of conductive metal silicide 202 formed between a nitride over layer 203 and a highly electrically resistive polysilicon line 201. As illustrated in the top view of FIG. 2B, which shows the eFUSE 146 in an intact position, the silicide 202 may form a relatively thin conductive fuse link 208 between an anode 204 and cathode 206. The fuse link 208 may be blown by applying a predetermined voltage across the anode 204 and cathode 206 (e.g., using the eFUSE control logic 310 shown in FIG. 3). The exact voltage and exposure time may vary for different embodiments. For some embodiments, driving a current of about 10 milliamperes at about 2.5-3.5 volts for about 200 microseconds through the silicide layer 202 causes the temperature of the silicide layer 202 and the polysilicon line 201 to rise, which sets up a thermal gradient. The thermal gradient causes the silicide layer 202 to migrate toward one end of the polysilicon line 201 as a result of electromigration principles. However, the current through the silicide layer 202 is sustained as long as the polysilicon line 201 remains hot, intrinsic, and conductive. The thermal gradient forces the electromigration of the silicide layer 202 to completion, i.e., drives the bulk of the silicide 202 in the fuse link 208 to the polysilicon layer 201, resulting in the non conductive depleted section 209 of the blown fuse illustrated in FIG. 2C.

The migration of the silicide layer 202 to one side of the polysilicon line 201 essentially opens the electrical circuit across the generally resistive polysilicon line 201 under normal operating conditions. As the electromigration process nears completion, a region absent of the conductive silicide 204 is formed on one end of the polysilicon line 201, which operates to break or blow the conductive path across the polysilicon line 201. The components then cool down and the eFUSE is left with the highly resistive polysilicon line having an uncontiguous coating of the conductive silicide 202 (the conductive silicide 202 has migrated to one end of the polysilicon line and left the opposing end of the line bare). This essentially causes an open circuit or blown eFUSE condition across the line material as a result of the lack of the conductive silicide 202 coating. Although specific materials and configurations of the materials are illustrated in the exemplary eFUSE 146 of FIGS. 2A-2C, embodiments of the invention are not intended to be limited to these materials and configurations or any specific materials or configurations, as the inventors recognize that other materials and configurations may be used effectively.

Given that the structure of the eFUSE 146 requires only the nanostructure line material (a resistive material) having a nanostructure silicide layer (a conductive material) conformed thereon, eFUSE technology is small enough to be used in nanotechnology based devices where conventional laser fuses are impractical as a result of physical size requirements. eFUSES are also easier and more chip friendly to program than conventional laser fuses, i.e., eFUSEs 146 generally require relatively low (electrical) energy levels to program them when compared to conventional laser programmed fuses that require substantially more (optical) energy levels that often causes detrimental particle dissemination when the laser fuse is blown. Additionally, laser blown fuses are generally only programmable at during fabrication (e.g., at the wafer testing stage), and not after shipment.

One skilled in the art will recognize that the eFUSES 146 may be initially in a non-conductive state and programmed to a non-conductive (blown) state, as described above or, alternatively, may initially be in a non-conductive state and programmed to a conductive state (the latter eFUSES are commonly referred to as antifuses). Antifuses generally are comprised of two conductors separated by an insulator. Programming is accomplished by forming a conductive trace through the insulator, and changing an open to a conductive element. Examples of antifuses are described in detail in the commonly owned patent U.S. Pat. No. 6,753, 590, herein incorporated by reference in its entirety.

A. E-Fuses to Prevent Tampering or Hacking into Devices

Returning to FIG. 1, an eFUSE 146 may be positioned in communication with the access control circuitry 142. In one embodiment of the invention, the eFUSE 146 may be positioned serially between an I/O line 161 of the test interface 140 and the access control circuitry 144, e.g., all signals transmitted between the test interface 140 and the outside world are required to travel through the eFUSE 146 via I/O line 161. In this configuration, the eFUSE 146 may be blown before the device 120 is shipped from the manufacturer, which disables access to the internal components of the device 120 through the test interface 140. Similarly, eFUSE 146 may be positioned serially with a selected input pin of the test interface 140. The selected input pin may be a predetermined pin that is required to gain access to specific information in the device 120 (e.g., the JTAG interface), and as such, when the eFUSE 146 is blown, unauthorized access to the information is no longer possible. In this configuration, the remaining inputs or pins to the test interface 140, i.e., pins that may be used to conduct testing procedures that do not allow for access to restricted or proprietary information, may still be used.

In another embodiment of the invention, a bank of eFUSEs 146 may be in communication with the lock register 144. The bank of eFUSEs 146 may be programmed at the factory to contain internally stored access codes 154. In this configuration, the eFUSEs 146 are used as a code storage element. However, the configuration of the eFUSEs 146 may make it more difficult for hackers to gain access to the internal access codes 154, as the eFUSEs 146 may be configured for limited access, e.g., access only upon startup of the chip. As such, a hacker would be required to restart the chip after every unsuccessful attempt at accessing the codes stored in the eFUSEs 146, which generally makes it impractical for hacking due to the time limitations, whereas with conventional storage elements it is often possible to send multiple unauthorized access attempts at a memory device without restarting the device.

Figure 3:
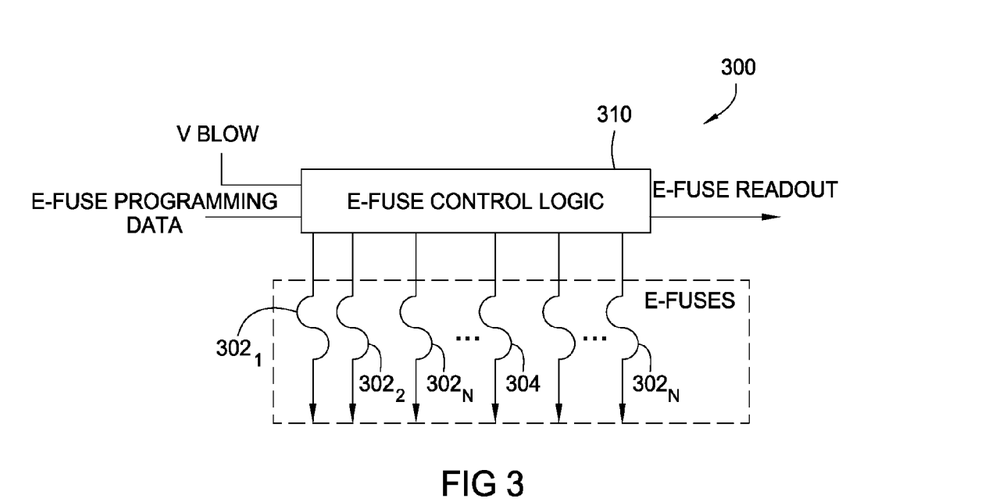
FIG. 3 illustrates a schematic view of a bank of eFUSEs and the associated control module.

Referring now to FIG. 3, for some embodiments, a bank of eFUSEs $302_1 \ldots 302_N$ may be used to store the access code 154 (shown in FIG. 1) information. As illustrated, eFUSE control logic 310 may be included in such embodiments, to control the blowing of the eFUSEs 302 by applying a blow voltage ($V_{BLOW}$) to selected eFUSEs 302, as indicated by eFUSE programming data (which may be a simple bit string indicating which eFUSEs are to be blown) that may be received from tester 110 (shown in FIG. 1), for example, during the manufacturing and/or testing process. The eFUSE control logic 310 may also be used to readout the state of the eFUSEs 302, which may subsequently be latched into registers or transmitted to the access control circuitry 142 (shown in FIG. 1).

In this configuration, security access codes (or any other data) contained in the eFUSEs 302 may be changed or updated if required. Although a blown eFUSE 302 may not be reprogrammed, other eFUSEs 302 in the bank of eFUSEs 302 may be blown to change information stored thereon if desired. However, the ability to change the information may be strictly controlled by the eFUSE control logic 301, the access control circuitry, and/or other components of the device to prevent hackers from changing the access codes 154 (shown in FIG. 1) to facilitate their attack on the device. This configuration may be used to allow the chip to remain in a fully open and accessible test mode during the manufacturing process (to allow for unimpeded testing and analysis of the chips operation), and then after the eFUSEs are programmed (generally after manufacturing and testing processes are completed), access to restricted areas of the chip may be substantially limited or eliminated to prevent tampering or hacking at the user level.

In another embodiment of the invention, eFUSEs may be used to provide a first and second tamper bits (up to N tamper bits) used to detect and prevent hacking attempts. In this embodiment of the invention, a first tamper bit (eFUSE) may be blown when a first unauthorized access attempt is detected. This first tamper bit may indicate a possible inadvertent access attempt (e.g., a mistake) and may allow the device to continue functioning. However, in response to detecting another unauthorized access attempt a second tamper bit (eFUSE) may be blown. If both (or all N) tamper bits (eFUSEs) are blown, the device controller may disable functionality of the device. In this embodiment, the device may be provided with an algorithm which reads an Electronic Chip Identification (ECID) from a register, and through a hidden formula enabled by a series of input bits. A latch is then set that allows for manufacturer programming of the module program bits. If a user attempts such programming without the proper ECID formula, the programming will result in opening at least one tamper bit, which will render the entire module inoperable (based upon how many attempts the manufacturer determines represents a malicious hacking attempt).

For some embodiments, when the tamper bits are open (blown eFUSEs) and the functionality of the device is disabled, then the user is required to return the device to the manufacturer. The manufacturer can review the state of the tamper bits to determine if the device has been hacked. If the device has not been hacked or if the manufacturer otherwise decides that the chip should be re-enabled, then assuming that not all of the tamper bits have been programmed, the manufacturer can reset the tamper control to the next highest order bits and return the device to service under the same tamper control algorithm. For some embodiments, the tamper bits may reside in a secondary tamper control unit (e.g., as part of a multichip package). In such embodiments, the manufacturer may replace the entire tamper control unit. In another embodiment, the tamper control unit (either on chip or off chip) may have a secondary set (or more) of units that can be initialized (or selected) by the manufacturer, thus resetting the tamper status. For some embodiments, the eFUSES may also be used to store a (snapshot) bit string used during a hacking attempt, which may provide the manufacturer with some insight into exactly how a hacker is attempting to gain unauthorized access to the device.

Figure 4:
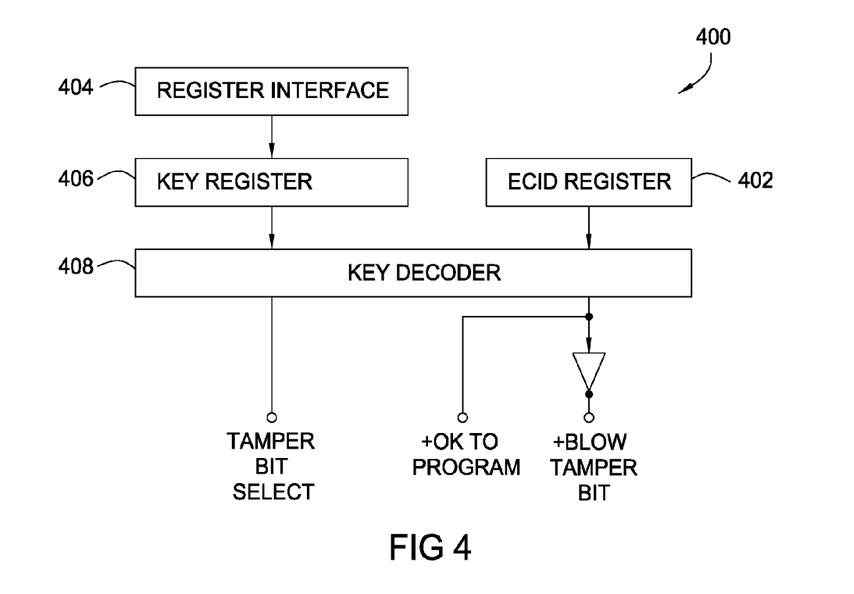
FIG. 4 illustrates a schematic view of a decoder module that may be used in the integrated circuit devices, in accordance with one embodiment of the present invention.

FIG. 4 illustrates a hardware configuration that may be used to implement the previously described tamper control embodiments of the invention. The tamper control configuration 400 includes an ECID register 402 connected to a key decoder 408, and a register interface 404 connected to a key register 406 that is also connected to the key decoder 408. The key decoder includes I/Os for the tamper bit select, OK to program, and blow tamper bit. In operation, the tamper control configuration 400 reads the ECID from the register 402. The configuration 400 then calculates a key based on a proprietary algorithm, which will generally be complicated enough that it is impractical to accomplish reprogramming in a low cost environment, even if the algorithm became known. Then the configuration loads the key register 406 with the calculated key, and the associated eFUSEs are reprogrammed.

The key register 406 is generally an undocumented or reserved register generally known only to the device manufacturer and the customer. If the proper key is not entered when the fuse programming operation is initiated, the only thing that happens is that the tamper bit fuse is blown. The tamper bit select line could be controlled by a second independent key. Assertion of this line, pending a manufacturer bit count, would cause yet another fuse to be blown indicating that the second or auxiliary tamper bit was selected, thus indicating a hacking situation and disabling the functionality of the device.

The inventors also contemplate a tamper resistant system where tamper bits can only be changed a specific number of times. This would be appreciated in industries such as the DVD industry to prevent copying of the material on the DVD. A system for this application could be based on an increased number of tamper bits and a comparator. Once the count of the tamper bits exceeds a certain threshold, the programmability is disabled, which would substantially reduce copying of DVD material.

B. Maintaining a Secure Product State at the End User.

In embodiments of the invention where eFUSEs (or other storage elements) are used to store secure access codes or version information, a secondary layer of eFUSEs may be used to insulate the access codes or version information from unauthorized access. For example, a bank or array of eFUSEs, such as the bank of eFUSEs 300 illustrated in FIG. 3, could be used to replace the non-volatile storage element 150 illustrated in FIG. 1 and may contain access codes or version information for the device 120. The bank of eFUSEs 300 could be rendered un-writable or generally inaccessible from exterior devices once the device has passed a certain point in the build process. This type of access control may be accomplished via a buffer or security access layer of eFUSEs (a second group of eFUSEs that may be positioned where fuses 146 are shown in FIG. 1), configured to control access to the bank of eFUSEs containing the access codes or version information for the device. In this configuration, once the eFUSE bank 300 is programmed with the secure information, the secure information will only be readable during the normal operation of the chip and is generally unreadable to the outside world as a result of the buffer or security layer of eFUSEs, which prevents the state of the outputs of the secure eFUSE bank 300 containing the access codes or version information from being accessible to a scan conducted by a hacker who forces the device into a test mode. The use of the secondary eFUSE bank 300 may similarly be used to insulate access to another memory device containing similar information, if desired.

Figure 5:
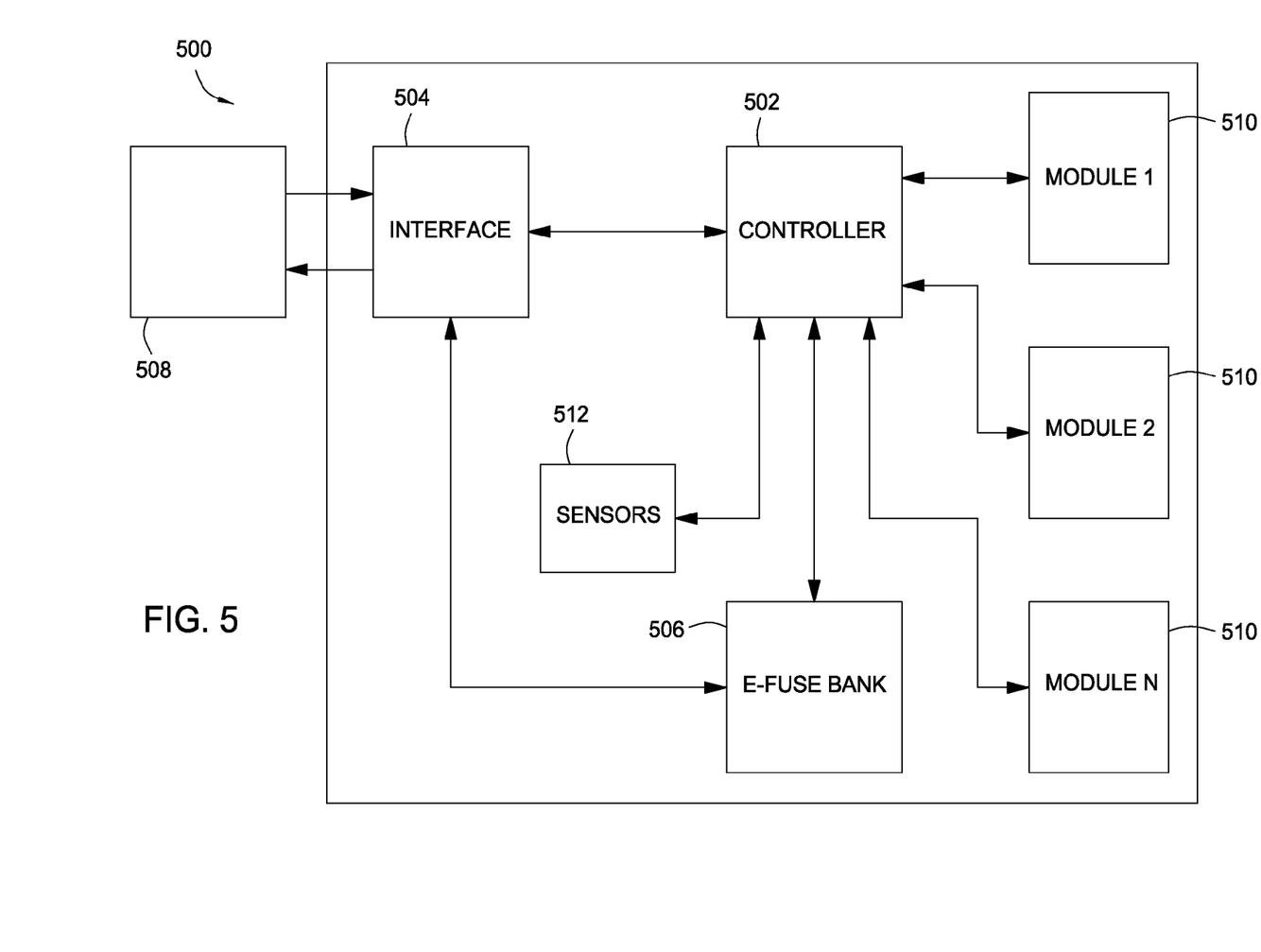
FIG. 5 illustrates a schematic view of an exemplary integrated circuit device, in accordance with one embodiment of the present invention.

FIG. 5 illustrates an embodiment of a device configured to securely store the state of a device after the device has been shipped. The device 500, which is generally an integrated circuit device, includes a device controller 502 in communication with a device interface 504. The controller 502 generally operates to control the operation of the other components of the device 500. The interface 504 operates to communicate information into and out of the device, i.e., to interface with the outside world, which is represented by an external device or component 508. The controller 502 and/or interface 504 are also generally in communication with one or more eFUSEs 506, which may be an eFUSE bank similar to bank 300 illustrated in FIG. 3. The controller is also generally in communication with a plurality of device modules 510. The device modules 510 may include functional blocks of the device 510, system components such as clocks, multiplexers, floating point units, digital signal processors, etc., or other components generally associated with integrated circuit-type devices.

The embodiment of device 500 may be used to securely store the state of a device after the device has been shipped. For example, the bank of eFUSEs 506 may be programmed at the manufacturing facility to a desired access level via the controller 502 and the interface 504. The desired access level may be used to regulate what information on or in the device 500 is accessible to external devices 508. For example, the access level of device 500 may be set to a test mode, a shipped mode, a functional mode, a debug mode, or a dead mode, wherein each access level corresponds to a unique configuration of accessibility of the internal components or modules 510 of the device. In the test mode, for example, specific eFUSEs 506 may be blown (or remain intact/unblown) to set up the device communication channels such that all of the scan chains of the device may be connected to the external device interface 504 and are accessible to the outside world 508. The test mode would be useful during the device testing phase of device manufacture. The test mode represented by the sequence of blown eFUSEs 506 will generally be read on startup of the chip or device by the controller 502, which will then enable or disable the appropriate modules 510 represented by the selected mode of the device.

After the device has been tested in the manufacturing process, the eFUSEs 506 may be further programmed (more fuses may be blown) to configure the device 500 for shipping to a secondary manufacturer. In similar fashion to the test mode, when the device 500 is programmed for a ship mode, when the device 500 powers up it will read the state of the eFUSEs 506 and set up or configure the device 500 accordingly. For example, the shipped mode may configure the device 500 such that the scan chains for all of the secure memories (certain ones of modules 510) of the device 500 are inaccessible to external components 508, thus preventing the second party manufacturer from viewing the secure portions of the device (encryption keys, product identification, etc.).

Similarly, once the second party manufacturer has installed the device 500 into the end user product, the eFUSEs 506 may be further programmed to configure the device 500 in a functional mode. In the functional mode, for example, all registers (certain ones of modules 510) generally available in the test or shipped modes are no longer available, as accessing or modifying these registers at the functional stage of the device would generally be indicative of a hacking attempt.

C. Using E-Fuses to Disable a Device Upon Encountering a Hacking Attempt

As previously described, with reference to FIG. 4, in some embodiments of the invention, eFUSEs may be used as an anti-hacking measure. In such embodiments, chip controllers or other modules on the devices are configured to detect when a hacking attempt has occurred. When a hacking attempt is detected (or when a predetermined number of hacking attempts have been detected), the controller may operate to blow one or more eFUSES that control various functionalities of the device, e.g., placing the device in the previously mentioned dead mode.

For example, in a chip used for a game controller, which may be represented by the device 500 illustrated in FIG. 5, when a hacking attempt is first detected, the chip controller 502 may disregard the first detection as a possible error. However, if a second hacking attempt is detected within a predetermined time period, then the controller 502 may determine that a hacker is attempting to compromise the device 500 and blow one or more eFUSES 506 in the device 500. The eFUSEs 506 blown by the controller 502 are generally connected, either directly or indirectly through other modules, such as a control module, to one or more of the functional modules 510 of the device that are primary to the functionality of the device. Thus, the blowing of the eFUSE 506 associated with one or more of the primary functional modules 510 of the device 500 operates to render the device 500 not operational, i.e., the eFUSEs 506 may be serially connected to I/O pins of the device or to the system clock for the device, for example. As such, blowing the fuse 506 associated with these components or pins essentially renders the device 500 dead. Alternatively, the eFUSEs 506 blown upon detection of a hacking attempt may be selected to only partially disable the device's functionality, e.g., to slow the chip's operation, or to render the device 500 not operational for a predetermined period of time. This would operate as a deterrent to hackers if the manufacturer did not want to completely disable the device 500 upon encountering hacking attempts.

This embodiment is also useful to the manufacturer for determining which returned chips have been subject to an attempted hack. More particularly, when chips are returned to the manufacturer as not operational, the manufacturer can test the state of the eFUSEs in the chip to determine if the eFUSEs associated with a hacking attempt have been blown. If the anti-hacking eFUSEs have been blown, then the manufacturer will know that the chip has been subject to a hacking attempt and will have the option to refuse to replace the chip as a result of the hacking attempt. As previously described, eFUSES may also be used to store bit strings used by a hacker in an attempt to break into a system. These bit strings may allow a manufacturer to, in effect, reverse engineer a hacker's reverse engineering attempt.

D. Modification of a Device State After Shipping the Device

In another embodiment of the invention, eFUSEs may be used to store a state or version of a device that may be subsequently updated or modified by the manufacturer without replacing the device. For example, referring to FIG. 4, an eFUSE bank 506 may be implemented into a device 500 and programmed with a unique device state, wherein the unique device state corresponds with a particular part of the device build process. In this embodiment, when the device 500 powers up, the unique device state is read by the device controller 502, for example, from the eFUSE bank 506. The unique device state stored in the eFUSE bank 506 can be used by the device controller 502 to activate or deactivate particular modules 510 of the device. The activation or deactivation may include terminating clock signals to specific modules 510, terminating multiplexer selects, disconnecting I/O lines associated with particular functions of the device, etc. to configure a device in accordance with the unique device state represented by the eFUSE bank 506. The activation of only selected clock signals, muxs, I/O lines, etc. allows the manufacturer to select specific modules 510 (e.g. floating point units, SRAM blocks, etc.) of the device 500 that are to be enabled or activated for each application of the device 500. As such, the manufacturer may utilize a single device or chip for multiple applications of varying complexity, as the various modules or portions required to support the complexity of the particular application may be selectively enabled by the programming of the eFUSE bank 506.

Additionally, the eFUSE bank 506 storing the unique device state may be subsequently modified to upgrade the capability of the device or chip after the device 500 reaches the end user. For example, the eFUSE bank 506 storing the unique device state may be accessed by the manufacturer through the interface 504. The manufacturer may program a second unique device state into the eFUSE bank 506 that changes the device state of the chip. For example, the manufacturer may burn one or more additional eFUSEs 506 to create a second unique device state that operates to activate additional module 510 or functionality of the device 500, thus upgrading or improving the device capability without replacing or otherwise physically removing the device 500 from the system the device is associated with. This functionality may be used to upgrade the device capability or functionality insitu.

In another embodiment of the invention, the eFUSEs 506 may be used to modify a state of the device 500 after a predetermined period of time. This feature may be used, for example, to modify the functionality of a device after a license period has expired (e.g., an eFUSE bank may be used to take on the role of a "chip odometer" or an "on/off key"). In this embodiment, the chip controller 502 is programmed to blow one or more eFUSEs 506 on the device 500 after a predetermined period of time has expired. The eFUSE 506 is connected to an enabling function, e.g., a clock signal or a mux select, of a critical module 510 of the device 500 that is related to the licensed technology. As such, when the controller 502 blows the eFUSE 506, the functionality associated with the license is disabled and is therefore not operational, or placed in an operation mode with limited functionality. If the user then wants to re-enable the technology via payment of a license fee, then the functionality of the chip may be re-enabled via other embodiments of the invention where the state of eFUSEs is changed to upgrade or update chip functionality or states, as described herein. For some embodiments, such a transaction (payment of a fee and upgrading of a device) may be carried out entirely remotely. For example, a user with a gaming system connected to the Internet may purchase additional features via an Internet transaction. The additional features may be enabled by the blowing of eFuses which is automatically initiated when the purchase is complete.

E. Modification of Device Parameters After Installation of the Device

In another embodiment of the invention, eFUSEs may be used to modify device parameters after the device has been shipped to the end user and is in operation. As an example, integrated circuit devices often see an environmentally generated degradation from nominal performance over time, which causes the device to perform at less than optimum levels. In conventional integrated circuit devices, once parameters of the device begin to degrade, there is no fix, and the performance of the device will begin to decrease. The present embodiment of the invention utilizes one or more eFUSEs that can be blown in response to detecting a degrading device parameter, wherein the blown eFUSE operates to change the device parameter in an effort to return the parameter to an optimal operating level. The eFUSES can also be used as described above in an odometer mode, configuring a CPU, for example, to run at a lower internally generated VDD, or at a different clock speed. In other words, the eFUSES may be used to control input stimulus of a device such that if a controller on the device reads a certain sequence, appropriate action is taken.

The integrated circuit device 500 illustrated in FIG. 5 may be configured to implement the embodiment of the invention where eFUSEs may be used to modify device parameters after the device has been shipped to the end user and is in operation. More particularly, device 500 may include one or more sensors 512 that are configured to measure various system parameters, or alternatively, the device 500 may access one or more externally positioned sensors (not shown). For example, sensors 512 may be configured to measure voltage of components or circuits on the device 500, current traveling through components or circuits on the device 500, the temperature of components or circuits on the device 500, the frequency of components, such as clocks, in the device 500, and any other device parameters that are measurable.

In this embodiment, the controller is programmed to monitor the sensors 512. When one of sensors 512 detects a device parameter that the system controller 502 determines is indicative of environmental degradation, then the system controller 502 may blow one or more eFUSEs 506 that correspond to the device parameter determined to be degrading. For example, one of sensors 512 may be configured to monitor a component temperature. If the component temperature is determined to be in excess of a desired temperature for a sufficient amount of time, then the system controller 502 may increase a voltage or current that corresponds to a fan control voltage or current. The fan current or voltage, for example, may be increased until the temperature sensor indicates that the operating temperature is within a normal range. Then the system controller 502 may blow one or more eFUSEs 506 that correspond to the voltage or current supplied to the system fan that are read by the system controller 502 on startup. This is helpful to integrated circuit technology, and the ability for insitu parameter modification may extend the devices useful life by compensating the environmental degradation that would otherwise render the device unusable before its maximum lifespan.

Thereafter, when the device is powered up again and the controller reads the eFUSEs 506 to determine the device setup or configuration parameters, the blown eFUSE 506 that corresponds to the fan voltage or current would cause the fan to increase the cooling effect, and thus, cool the over temperature component to the desired operating range. This type of configuration may be used to adjust device voltages, frequencies, currents, temperatures, etc. as required by the particular application. Additionally, the eFUSEs 506 may be programmed multiple times, e.g., additional fuses may be blown to change parameters multiple times if required.

Thus, embodiments described herein provide an adaptive system controller using permanent eFUSES that implement a function similar to an odometer. Due to the permanent nature of the eFUSES (i.e., eFUSES are only able to be programmed once), the odometer has the inherent feature that it cannot be turned back. Thus systems may adaptively adjust to BOTH environment (external) conditions and intrinsic properties. While the example above described reacting to the environment, a sensor 512 may also be configured to monitor an intrinsic property, such as a device threshold voltage, a ring oscillator frequency, or an amplifier gain, for example. Initial values may be stored and degradation of these values to a predetermined level may be detected and used to trigger additional bits to be programmed setting a new value in conjunction with an updated action to minimize further degradation. A controller may thus utilize eFUSES to adjust system parameters and adapt performance autonomously. Parameters may be changed multiple times by blowing different eFUSES.

For some embodiments, for example, as part of an enhanced security feature, an eFUSE bank may be used to render a device ineffective (partially or wholly inoperable) under certain circumstances. For example, a sensor, such as sensor 512, may be used as a position or motions sensor to detect if a particular (e.g., a mission critical) module is removed from a system prior to placing a device in an anti-hack mode, a non-volatile latch may be set. This latch may result in the eFUSE bank being programmed in a manner designed to scramble the control bits function, and render the part either useless, or to deploy decoy paths (e.g., useless bit strings). Assuming the part is removed prior to such programming, the latch may cause such eFUSE programming to happen the next time the device is powered up.

As an alternative, eFUSE programming may be established to randomly alter/disable device logic by sending high voltage spike to various regions within the device cores, essentially creating an antifuse out of typical functioning field effect transistors (FETs). Such antifuses (generated by randomly or pseudo-randomly applying high voltage spikes to FETs) are generally undetectable to a hacker, but would render a device functions useless. For some embodiments, relatively simple bootstrap capacitors may be used to deliver random spikes based on eFUSE initiation. The sequence of high voltage spikes (including which FETs are blown) may be stored in non-volatile memory and generated on power up, preventing hackers from avoiding this action by power down or chip removal.

F. Controlling Component Compatibility with eFUSES.

In another embodiment of the invention, eFUSEs may be used to control component compatibility on or in communication with integrated circuit devices. For example, embodiments of the invention may utilize an eFUSE bank to store part numbers and control parameters for external system components, such as fans, power supplies, additional memory components, additional processors, and communication devices. Such operating parameters are conventionally stored in a software initialization (e.g., *.ini) file, which can become corrupted. However, in this embodiment, these operating parameters or conditions for the additional external components stored in an eFUSE bank may be read on system power up and used to configure the system. In other words, use of the eFUSE bank allows this information to be stored directly within an integrated circuit.

This embodiment of the invention may also be used to eliminate the need for having unique chip part number bins at the manufacturing stage, as the components that interface with a particular chip may receive configuration instructions from the chip itself. As an alternative, the chip may set the operating parameters for one or more peripheral devices (e.g., operating voltage or speed) based on corresponding operating information stored in the eFUSES. In either case, this embodiment of the invention eliminates the need for a unique part "X" to be coupled only with another unique part "Y", as now part "X" can represent part numbers 1 through 10, which all can be used with parts A through Z, for example. Thus, embodiments of the invention can reduce supply chain issues as a result of part number management and easier fulfillment.

While the foregoing is directed to embodiments of the present invention, other and further embodiments of the invention may be devised without departing from the basic scope thereof, and the scope thereof is determined by the claims that follow.

What is claimed is:

1. A method for controlling access to specific modules of an integrated circuit device, comprising:
   setting a device state for the integrated circuit device in an electrically programmable fuse bank comprising a plurality of electrically programmable fuses, wherein setting a device state comprises blowing a sequence of electrically programmable fuses in the electrically programmable fuse bank to generate a unique device state identifier that is used by a controller to regulate access to the at least one chip register via a communication interface;
   reading the device state from the electrically programmable fuse bank with the device controller; and
   disabling modules of the integrated circuit device in accordance with the device state read by the device controller, wherein disabling modules comprises placing the device in a dead device state by at least one of turning off a clock signal to a module, disabling a multiplexer select associated with a module, or disabling an I/O line of the module.

2. The method of claim 1, wherein reading the device state comprises reading the unique device state identifier upon startup of the device and configuring the device in accordance with the unique device state identifier.

3. The method of claim 1, wherein the unique device state comprises at least one of a test state, a shipped state, and a functional state.

4. The method of claim 3, wherein the test state comprises a device configuration wherein selected device registers containing proprietary information are allow completely accessible through the interface.

5. The method of claim 3, wherein the shipped state comprises a device configuration wherein selected device registers containing proprietary information are not accessible through the interface.

6. The method of claim 3, wherein the functional state comprises a device configuration where all registers not intended to be accessible to an end user of the device are not accessible through the interface.

7. The method of claim 1, wherein disabling modules comprises rendering the modules inaccessible to external components.

8. A method for controlling access to chip registers throughout the life of the chip, comprising:
   setting a device state into a bank of electrically programmable fuses on the chip;
   reading the device state on startup of the chip; and
   configuring access to registers of the chip in accordance with the read device state during the chip initialization process, wherein configuring access to registers comprises enabling, disabling, or partially disabling read access to registers.

9. The method of claim 8, wherein setting the device state comprises blowing a sequence of electrically programmable fuses in a bank of electrically programmable fuses to create a unique device state identifier represented by the bank of electrically programmable fuses.

10. The method of claim 9, wherein reading the device state comprises reading the device state with a system controller.

11. The method of claim 10, wherein configuring access to registers is done with the system controller in accordance with the unique device state identifier.

12. The method of claim 11, wherein the unique device state identifier comprises at least one of a test identifier, a shipped identifier, and a functional identifier.

13. The method of claim 12, wherein the test identifier is configured to allow complete access to the device registers.

14. The method of claim 12, wherein the shipped identifier is configured to allow for partially restricted access to the device registers.

15. The method of claim 12, wherein the functional identifier is configured to restrict access to all device registers not intended to be accessible to an end user of the device.

16. The method of claim 12, wherein the unique device state identifier may be reprogrammed at various stages of manufacturing, assembly, and shipping of the device to control access to proprietary information in the device.

17. An apparatus for controlling access to chip registers throughout the life of the chip, comprising:

a chip controller;

a chip communication interface in communication with the controller;

at least one chip register configured to store information therein; and an electrically programmable fuse bank positioned in communication with controller, the electrically programmable fuse bank being programmable with a unique device state that is used by the controller to regulate access to the at least one chip register via the communication interface, wherein regulating access to the at least one chip register includes enabling, disabling, or partially disabling read access.

18. The apparatus of claim 17, wherein the unique device state comprises at least one of a test state, a shipped state, and a functional state.

19. The apparatus of claim 18, wherein the test state comprises a configuration where the at least one chip register is accessible to external devices via the communication interface.

20. The apparatus of claim 18, wherein the functional state comprises a configuration where information in the at least one register that is not intended to be accessible to an end user of the device is not accessible.

* * * * *